(12) United States Patent
Hosoda (10) Patent No.: US 8,473,682 B2
(45) Date of Patent: Jun. 25, 2013

(54) CACHE UNIT AND PROCESSING SYSTEM

(75) Inventor: Soichiro Hosoda, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 400 days.

(21) Appl. No.: 12/953,666

(22) Filed: Nov. 24, 2010

(65) Prior Publication Data

US 2012/0042128 A1 Feb. 16, 2012

(30) Foreign Application Priority Data

Aug. 12, 2010 (JP) .................................. 2010-180807

(51) Int. Cl.
*G06F 12/08* (2006.01)
(52) U.S. Cl.
USPC ...................... 711/122; 711/138; 711/E12.02
(58) Field of Classification Search
None
See application file for complete search history.

(56) References Cited

FOREIGN PATENT DOCUMENTS

| JP | 07-319767 | 12/1995 |
|---|---|---|
| WO | 2006018802 | 2/2006 |

*Primary Examiner* — Kevin Verbrugge
(74) *Attorney, Agent, or Firm* — Turocy & Watson, LLP (57) ABSTRACT

According to one embodiment, a cache unit transferring data from a memory connected to the cache unit via a bus incompatible with a critical word first (CWF) to an L1-cache having a first line size and connected to the cache unit via a bus compatible with the CWF. The unit includes cache and un-cache controllers. The cache controller includes an L2-cache and a request converter. The L2-cache has a second line size greater than or equal to the first line size. The request converter converts a first refill request into a second refill request when a head address of a burst transfer of the first refill request is in the L2-cache. The un-cache controller transfers the second refill request to the memory, receives data to be processed corresponding to the second refill request from the memory, and transfers the received data to the L1-cache.

20 Claims, 12 Drawing Sheets

| PUID | TIME STAMP |
|------|------------|
| 0 | T1 |
| 3 | T2 |
| 1 | T3 |
| 2 | T4 |

CACHE UNIT AND PROCESSING SYSTEM

CROSS REFERENCE TO RELATED APPLICATIONS

This application is based upon and claims the benefit of priority from the prior Japanese Patent Application No. 2010-180807, filed on Aug. 12, 2010, the entire contents of which are incorporated herein by reference.

FIELD

Embodiments of the present invention relate to a cache unit and a processing system.

BACKGROUND

Conventionally, in a chip set such as a system-on-chip (hereinafter referred to as "SoC (System on Chip)") in which a critical word first (hereinafter referred to as "CWF (Critical Word First)") compatible bus and a CWF incompatible bus coexist, when data requested by a processing unit connected to the CWF compatible bus is stored in a main memory such as a DRAM (Dynamic Random Access Memory) connected to the CWF incompatible bus, the data is transferred from the main memory to the processing unit via the CWF incompatible bus.

However, data that the processing unit will process (hereinafter referred to "critical word") is included at a random position in the data transferred from the main memory. In this case, the processing unit remains on a stall state until the processing unit receives the critical word. As a result, the processing efficiency of the processing unit decreases.

Conventionally, it is desired to improve the processing efficiency of the processing unit when data is transferred from the main memory connected to the CWF incompatible bus to the processing unit connected to the CWF compatible bus.

DETAILED DESCRIPTION

Embodiments will now be explained with reference to the accompanying drawings.

According to one embodiment, a cache unit transferring data from a main memory connected to the cache unit via an external bus incompatible with a critical word first to a level one cache having a first line size and connected to the cache unit via an internal bus compatible with the critical word first. The unit includes a cache controller and an un-cache controller. The cache controller includes a level two cache and a request converter. The level two cache has a second line size greater than or equal to the first line size. The request converter is configured to convert a first refill request of refilling the level one cache into a second refill request in which a head address of a burst transfer is an address of data to be processed and a burst length is less than the first line size when a head address of a burst transfer of the first refill request is not present in the level two cache. The un-cache controller is configured to transfer the second refill request converted by the request converter to the main memory, receive the data to be processed corresponding to the second refill request from the main memory, and transfer the received data to the level one cache.

First Embodiment

A first embodiment will be explained.

Figure 1:
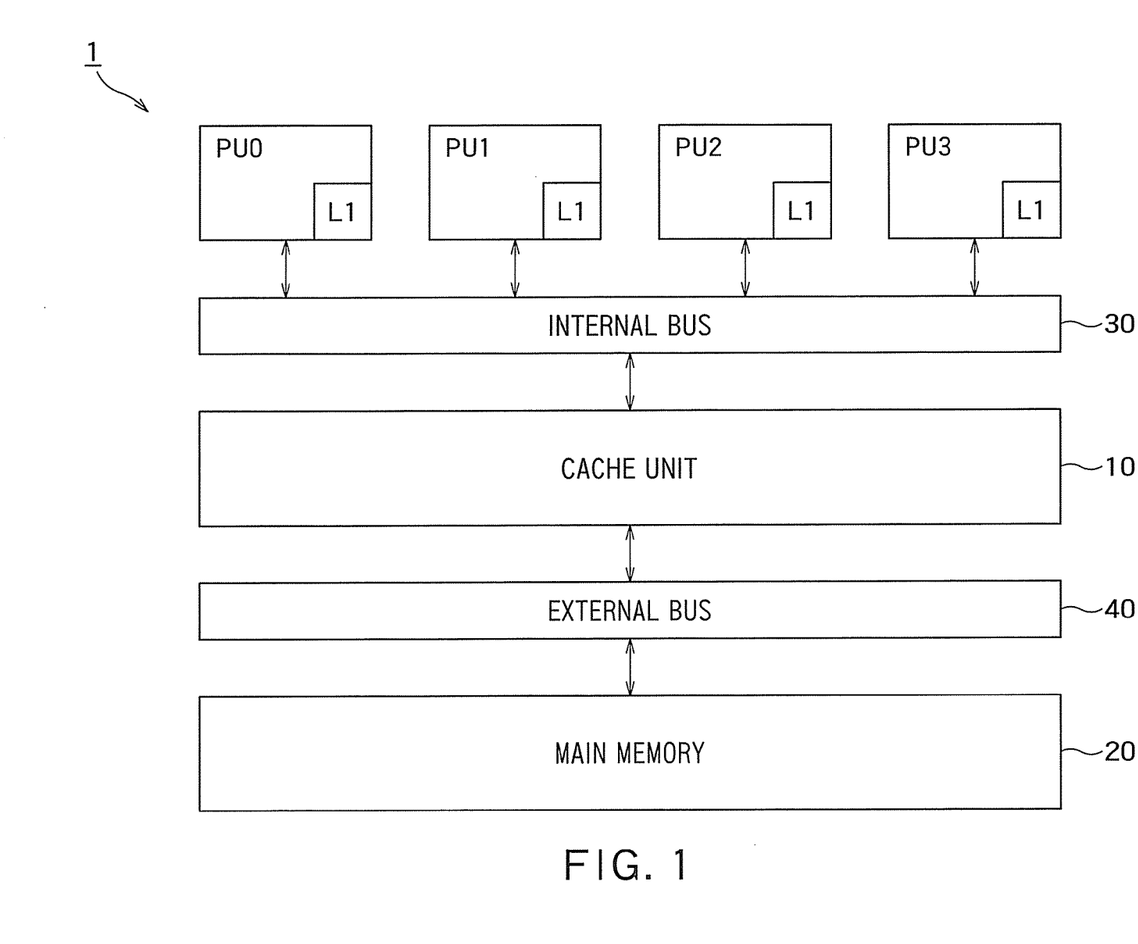
FIG. 1 is a block diagram showing a configuration of a processing system 1 according to the first embodiment.

A configuration of a processing system according to the first embodiment will be explained. FIG. 1 is a block diagram showing a configuration of a processing system 1 according to the first embodiment.

The processing system 1 is a system that performs data processing. The processing system 1 includes a plurality of processing units PU 0 to PU 3, a cache unit 10, a main memory 20, an internal bus 30, and an external bus 40.

Each of the processing units PU 0 to PU 3 includes a level 1 cache (hereinafter referred to as "L1-cache") L1. Each of the processing units PU 0 to PU 3 is a module that performs data processing on data to be processed. The L1-cache L1 is a memory having a first line size capable of storing data of a plurality of words. For example, the first line size is 8 words (64 bytes).

The cache unit 10 is a module that transfers data from the main memory 20 connected to the cache unit 10 via the external bus 40 that is incompatible with CWF to the L1-cache L1 that has the first line size and is connected to the cache unit 10 via the internal, bus 30 that is compatible with CWF.

The main memory 20 is a storage medium that can store data. For example, the main memory 20 is a DRAM.

The internal bus 30 is a data bus compatible with CWF.

The external bus 40 is a data bus compatible with an incremental (hereinafter referred to as "INCR") burst. The external bus 40 is incompatible with CWF.

Although FIG. 1 shows the processing system 1 in which each of the four processing units PU 0 to PU 3 includes an L1-cache L1, the number of the processing units is not limited to four and the processing units may not include the L1-cache L1.

Figure 2:
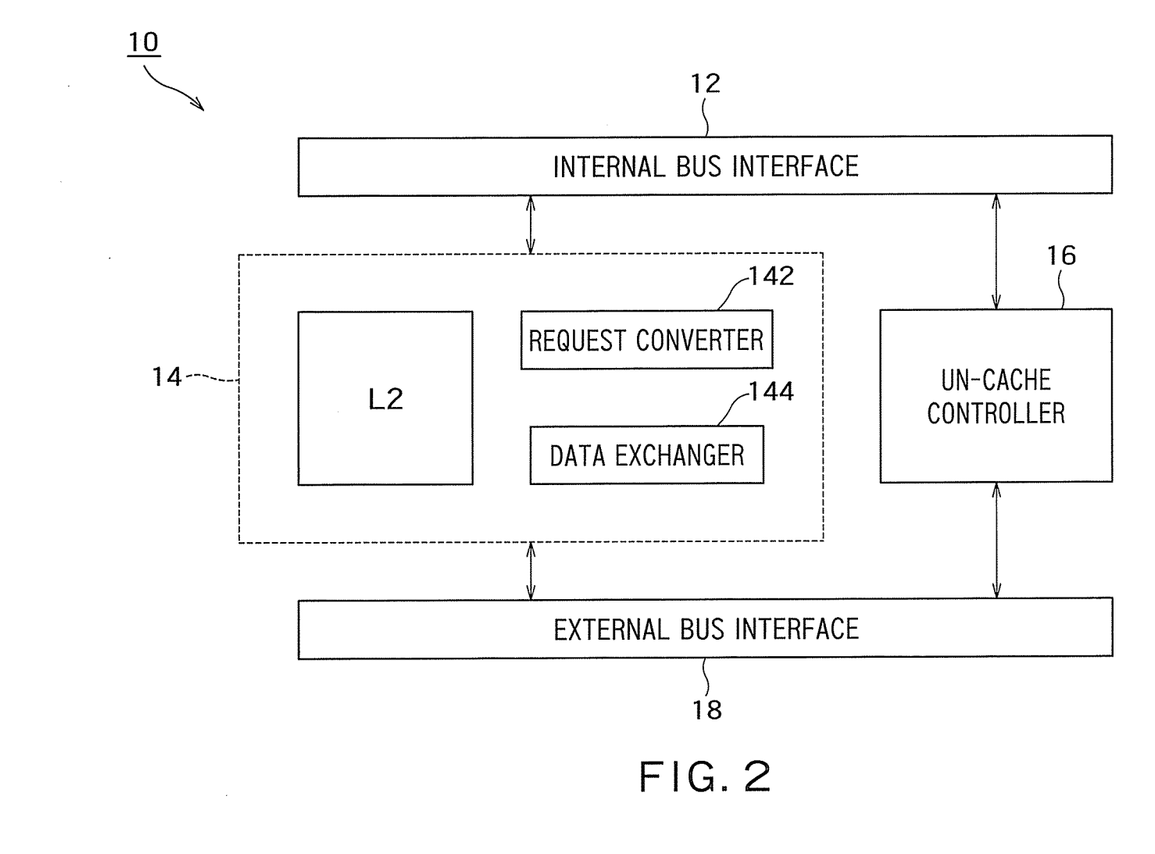
FIG. 2 is a block diagram showing a configuration of the cache unit 10.

FIG. 2 is a block diagram showing a configuration of the cache unit 10.

The cache unit 10 includes an internal bus interface 12, a cache controller 14, an un-cache controller 16, and an external bus interface 18.

The internal bus interface 12 is a module that transfers data in accordance with CWF which is a transfer protocol of the internal bus 30. The internal bus interface 12 is provided between a group of the cache controller 14, the un-cache controller 16 and the internal bus 30.

The cache controller 14 includes a level 2 cache (hereinafter referred to as "L2-cache") L2, a request converter 142, and a data exchanger 144. The cache controller 14 is a module that controls access to the L2-cache L2 and refills the L2-cache L2.

The L2-cache L2 is a memory having a second line size capable of storing data of a plurality of words. The second line size is greater than or equal to the first line size. For example, the second line size is 32 words (256 bytes).

The request converter 142 is a module that converts a first refill request into a second refill request.

The data exchanger 144 is a module that exchanges data.

The un-cache controller 16 is a module that controls access to modules other than the L2-cache L2, which include the main memory 20.

The external bus interface 18 is provided between a group of the cache controller 14, the un-cache controller 16 and the external bus 40.

An operation of the processing system 1 will be explained. Hereinafter, an example in which the processing unit PU 0 performs data processing on data to be processed that is not stored in the L1-cache L1 will be explained.

Figure 3:
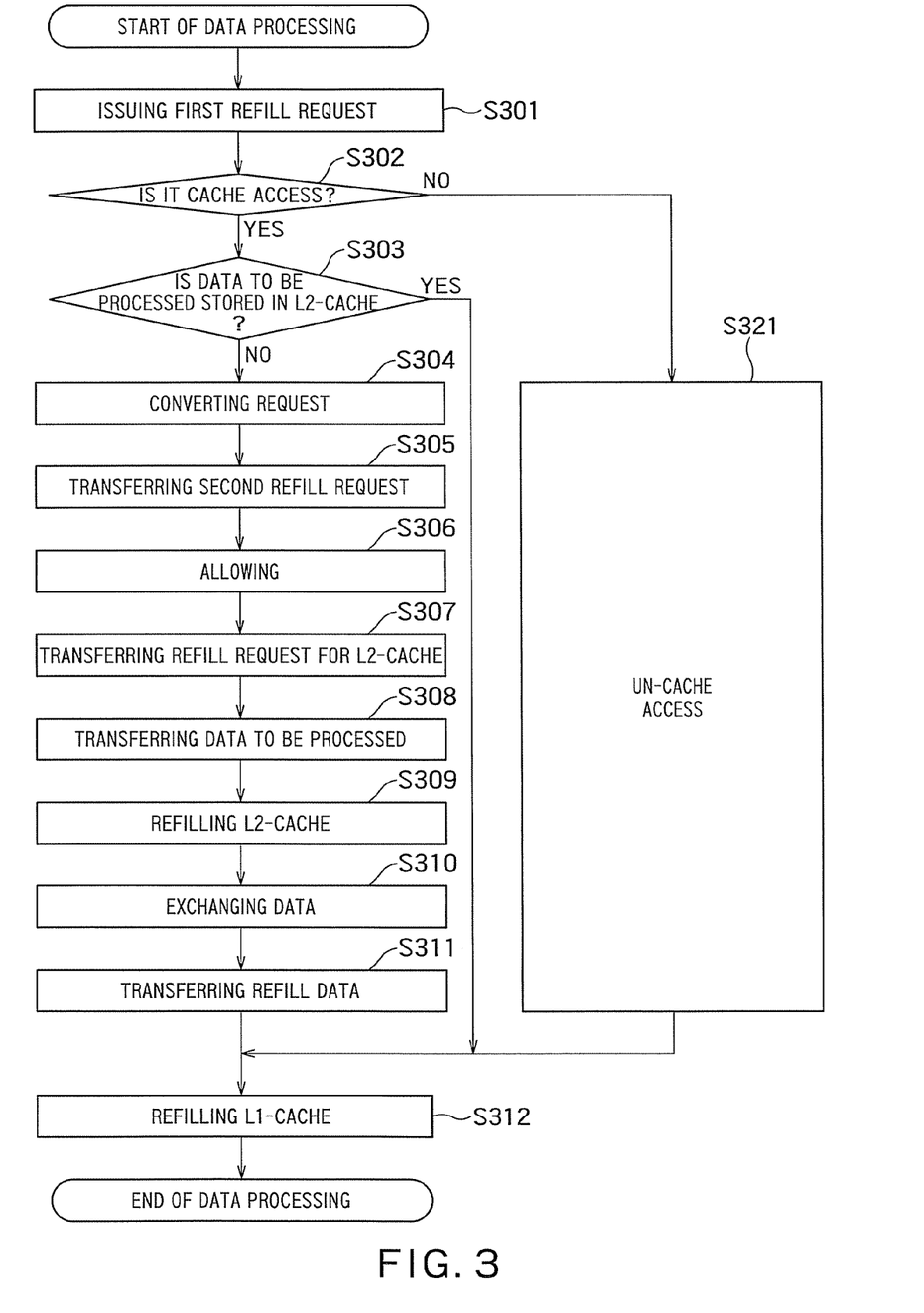
FIG. 3 is a flowchart showing a procedure of data processing of the processing system 1.
Figure 4:
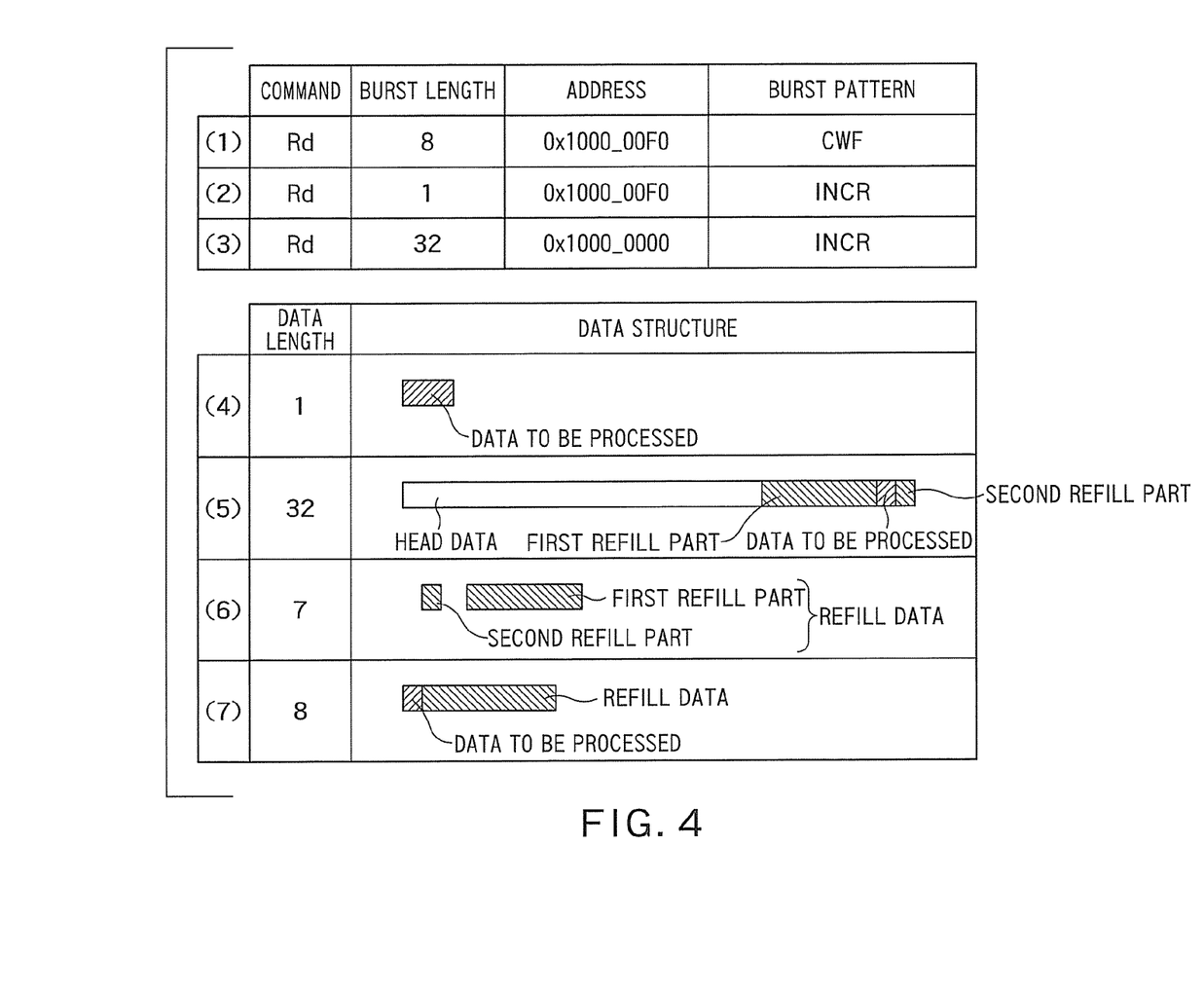
FIG. 4 is a schematic diagram showing a structure of data handled in the data processing in FIG. 3.
Figure 5:
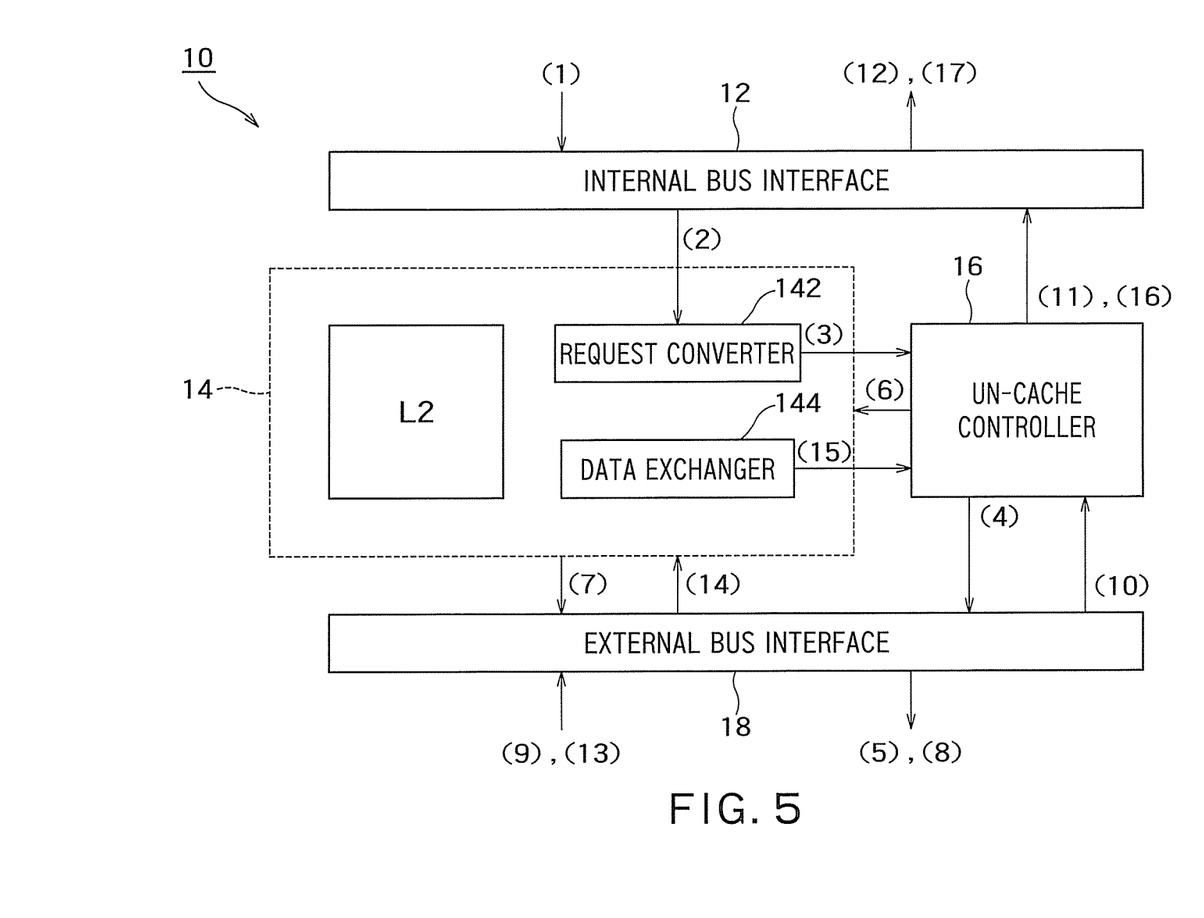
FIG. 5 is a block diagram showing a data flow in the cache unit 10 in the data processing in FIG. 3.

FIG. 3 is a flowchart showing a procedure of data processing of the processing system 1. FIG. 4 is a schematic diagram showing a structure of data handled in the data processing in FIG. 3. FIG. 5 is a block diagram showing a data flow in the cache unit 10 in the data processing in FIG. 3.

<Issuing first refill request (S301)> The processing unit PU 0 issues a first refill request (FIG. 4 (1)) of refilling the L1-cache L1, and transmits the issued first refill request to the internal bus interface 12 (FIG. 5 (1)). As shown in FIG. 4 (1), in the first refill request, a command indicating a request content is read (Rd), a burst length is the first line size (8 words), a head address of burst transfer is an address (0x1000__00F0) of data to be processed, and a burst pattern is the transfer protocol (CWF) of the internal bus 30. Specifically, the first refill request in FIG. 4 (1) is a request for sequentially transferring data of the address "0x1000__00F0", data of the address "0x1000__00F8", data of the address "0x1000__00C0", data of the address "0x1000__00C8", data of the address "0x1000__00D0", data of the address "0x1000__00D8", data of the address "0x1000__00E0", and data of the address "0x1000__00E8" by CWF.

<S302> The internal bus interface 12 determines whether the access is an access (hereinafter referred to as "cache access") to the cache controller 14 or an access (hereinafter referred to as "un-cache access") to the un-cache controller 16 on the basis of the address of the first refill request. For example, the internal bus interface 12 compares a list of memory space addresses of the cache access and the address of the first refill request. When the address of the first refill request is included in the list, the internal bus interface 12 determines that the access is the cache access. When the address of the first refill request is not included in the list, the internal bus interface 12 determines that the access is the un-cache access. When it is determined that the access is the cache access (S302:YES), the first refill request is transmitted to the request converter 142 (FIG. 5 (2)), and S303 is performed. When it is determined that the access is the un-cache access (S302: NO), the first refill request is transmitted to the un-cache controller 16, and un-cache access (S321) is performed.

<S303> The request converter 142 determines whether or not the data to be processed is stored in the L2-cache L2. Specifically, the request converter 142 determines whether or not the head address of the burst transfer of the first refill request is present in the L2-cache L2. For example, the internal bus interface 12 compares the address list of data stored in the L2-cache L2 and the address of the first refill request. When the address of the first refill request is included in the address list (in other words, the head address of the burst transfer of the first refill request is present in the L2-cache L2), it is determined that the data to be processed is stored in the L2-cache L2. When the address of the first refill request is not included in the address list (in other words, the head address of the burst transfer of the first refill request is not present in the L2-cache L2), it is determined that the data to be processed is not stored in the L2-cache L2. When it is determined that the data to be processed is stored in the L2-cache L2 (S303: YES), refilling L1-cache (S312) is performed. When it is determined that the data to be processed is not stored in the L2-cache L2 (S303: NO), converting request (S304) is performed.

<Converting request (S304)> The request converter 142 converts the first refill request into the second refill request (FIG. 4 (2)), and transmits the converted second refill request to the un-cache controller 16 (FIG. 5 (3)). More specifically, when the head address of the burst transfer of the first refill request is not present in the L2-cache L2, the request converter 142 converts the first refill request into the second refill request by shortening the burst length of the first refill request (for example, changing the burst length to one word). In the second refill request, the head address of the burst transfer is the address of the data to be processed, and the burst length is shorter than the first line size. As shown in FIG. 4 (2), in the second refill request, the request content is read (Rd), the head address of the burst transfer is the address of the data to be processed (0x1000__00F0), the burst length is one word, and the burst pattern is the transfer protocol (INCR) of the external bus 40. In summary, the second refill request of FIG. 4 (2) is a request for transferring data of the address "0x1000__00F0" by INCR.

<Transferring second refill request (S305)> The un-cache controller 16 transfers the second refill request to the external bus interface 18 (FIG. 5 (4)). Then, the external bus interface 18 transfers the second refill request to the main memory 20 via the external bus 40 (FIG. 5 (5)). In summary, the un-cache controller 16 transfers the second refill request converted by the request converter 142 to the main memory 20 via the external bus interface 18.

<Allowing (S306)> The un-cache controller 16 transmits an allowing notification for allowing a refill request of refilling the L2-cache L2 to the cache controller 14 at a predetermined timing (FIG. 5 (6)). For example, the allowing notification is one-bit information such as a flag indicating that the second refill request has been accepted by the external bus 40. For example, the predetermined timing is a timing when the external bus 40 has accepted the second refill request or a timing when it is determined that a command issued by the cache unit 10 after converting request (S304) does not overtake the second refill request. Thereby, refill data for the L1-cache is surely prevented from being transferred to the processing unit PU 0 earlier than the data to be processed.

<Transferring refill request for L2-cache (S307)>

After the cache controller 14 receives the allowing notification, the cache controller 14 issues a refill request of refilling the L2-cache L2 (FIG. 4 (3)), and transmits the issued refill request of refilling the L2-cache L2 to the external bus interface 18 (FIG. 5 (7)). Then, the external bus interface 18 transfers the refill request of refilling the L2-cache L2 to the main memory 20 (FIG. 5 (8)). In summary, the cache controller 14 requests data of the second line size including the data to be processed from the main memory 20 via the external bus interface 18.

<Transferring data to be processed (S308)> The external bus interface 18 receives the data of one word to be processed (FIG. 4 (4)) corresponding to the second refill request from the main memory 20 via the external bus 40 (FIG. 5 (9)). Then, the external bus interface 18 transfers the data to be processed to the un-cache controller 16 (FIG. 5 (10)). Then, the un-cache controller 16 transfers the data to be processed to the internal bus interface 12 (FIG. 5 (11)). Then, the internal bus interface 12 transfers the data to be processed to the processing unit PU 0 (FIG. 5 (12)). In summary, the un-cache controller 16 transfers the data to be processed received from the main memory 20 via the external bus interface 18 to the L1-cache L1 via the internal bus interface 12. Thereby, the processing unit PU 0 can receive only the data of one word to be processed in advance. In other words, the processing unit PU 0 receives the data to be processed corresponding to the first refill request in which burst pattern is CWF from the main memory 20 connected to the processing unit PU 0 via the external bus 40 which is incompatible with CWF. Thereafter, the processing unit PU 0 cancels the stall state and performs data processing on the data to be processed.

<Refilling L2-cache (S309)> The external bus interface 18 receives data of 32 word (FIG. 4 (5)) corresponding to the refill request of refilling the L2-cache L2 from the main memory 20 via the external bus 40 (FIG. 5 (13)). As shown in FIG. 4 (5), the data corresponding to the refill request of refilling the L2-cache L2 includes a head data of 24 words, a first refill part of 6 words located in front of the data to be processed, the data to be processed of one word, and a second refill part of one word located behind the data to be processed. Then, the external bus interface 18 transfers the data corresponding to the refill request of refilling the L2-cache L2 to the cache controller 14 (FIG. 5 (14)). Then, the cache controller 14 refills the L2-cache L2 on the basis of the data corresponding to the refill request of refilling the L2-cache L2.

<Exchanging data (S310)> The data exchanger 144 exchanges the data corresponding to the refill request of refilling the L2-cache L2 into refill data of 7 words (FIG. 4 (6)), and transmits the exchanged refill data to the un-cache controller 16 (FIG. 5 (15)). As shown in FIG. 4 (6), the refill data of 7 words includes the second refill part of one word and the first refill part of 6 words located behind the second refill part. The second refill part of one word is the data located behind the data to be processed in the data corresponding to the refill request of refilling the L2-cache L2 in FIG. 4 (5). The first refill part of 6 words is the data located in front of the data to be processed in the data corresponding to the refill request of refilling the L2-cache L2 in FIG. 4 (5).

For example, in the case that the data of one word to be processed is located between refill parts of 7 words in total in the data corresponding to the refill request of refilling the L2-cache L2 (in the case of FIG. 4 (5)), the data exchanger 144 exchanges the data corresponding to the refill request of refilling the L2-cache L2 into refill data of 7 words for the L1-cache L1 by changing the position of the data (the first refill part) located in front of the data to be processed to the position behind the data (the second refill part) located behind the data to be processed. For example, when the data to be processed is located at the rearmost position of the data corresponding to the refill request of refilling the L2-cache L2, the data exchanger 144 exchanges the data corresponding to the refill request of refilling the L2-cache L2 into refill data of 7 words by changing the position of the data of 7 words (refill parts) located in front of the data to be processed to the position behind the data to be processed. For example, when the data of 7 words (refill parts) is located behind the data to be processed, the data exchanger 144 exchanges the data corresponding to the refill request of refilling the L2-cache L2 into refill data of 7 words by extracting the data of 7 words (refill parts) located behind the data to be processed.

<Transferring refill data (S311)> The un-cache controller 16 transfers the refill data to the internal bus interface 12 (FIG. 5 (16)). Then, the internal bus interface 12 transfers the refill data to the processing unit PU 0 via the internal bus 30 (FIG. 5 (17)). Specifically, the data exchanger 144 exchanges the data of the second line size including the data to be processed requested by the cache controller 14 into refill data that should be located behind the data to be processed when refilling the L1-cache L1, and transfers the exchanged refill data to the processing unit PU 0 via the un-cache controller 16 and the internal bus interface 12. When data bypass transfer is possible before refilling the L2-cache L2, a set of exchanging data (S310) and transferring refill data (S311) may be performed before refilling L2-cache (S309) or may be performed in parallel with refilling L2-cache (S309).

<Refilling L1-cache (S312)> The processing unit PU 0 refills the L1-cache L1 on the basis of a data set of 8 words (FIG. 4 (7)) including the data of one word to be processed and the refill data of 7 words. In other words, the processing unit PU 0 refills the L1-cache L1 on the basis of the data that has a data structure compatible with CWF and is received from the main memory 20 connected to the processing unit PU 0 via the external bus 40 that is incompatible with CWF. Following completion of refilling L1-cache L1 (S312), processing data of FIG. 3 ends.

<Un-cache access (S321)> The un-cache controller 16 controls access to modules (for example, the main memory 20) other than the L2-cache L2. Following completion of un-cache access (S321), processing data of FIG. 3 ends.

According to the first embodiment, when data is transferred from a unit (main memory 20) connected to a bus incompatible with CWF (external bus 40) to a unit (processing units PU 0 to PU 3) connected to a bus compatible with CWF (internal bus 30), processing efficiency of the unit connected to the bus compatible with CWF can be improved.

Second Embodiment

A second embodiment will be explained. The second embodiment is an example of a cache controller including a switch. A configuration of a processing system according to the second embodiment is the same as that of the first embodiment, and the same description as that in the first embodiment will not be repeated.

Figure 6:
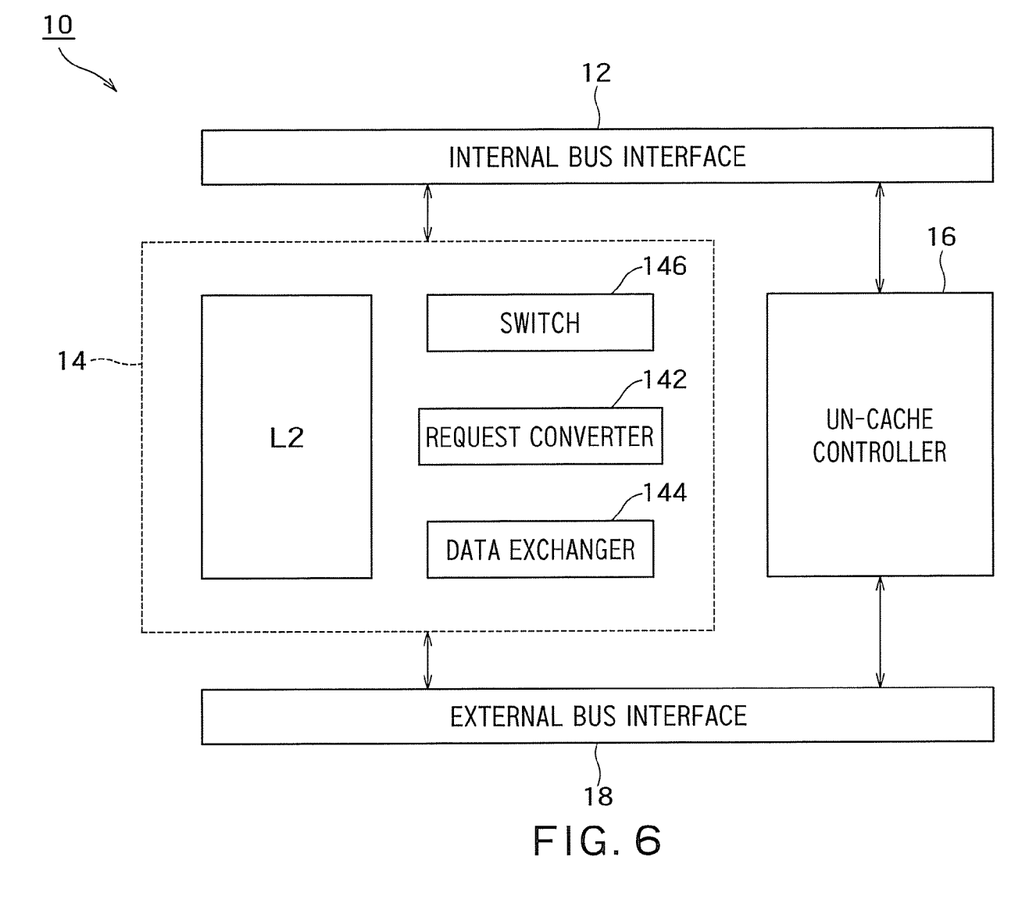
FIG. 6 is a block diagram showing a configuration of a cache unit 10 according to the second embodiment.

FIG. 6 is a block diagram showing a configuration of a cache unit 10 according to the second embodiment.

The cache unit 10 includes an internal bus interface 12, a cache controller 14, an un-cache controller 16, and an external bus interface 18. The internal bus interface 12, the un-cache controller 16, and the external bus interface 18 are the same as those of the first embodiment.

The cache controller 14 includes an L2-cache L2, a request converter 142, a data exchanger 144, and a switch 146. The cache controller 14 is a module that controls access to the L2-cache L2 and refills the L2-cache L2. The L2-cache L2, the request converter 142, and the data exchanger 144 are the same as those of the first embodiment.

The switch 146 is a module that switches active and inactive states of the request converter 142.

Figure 7:
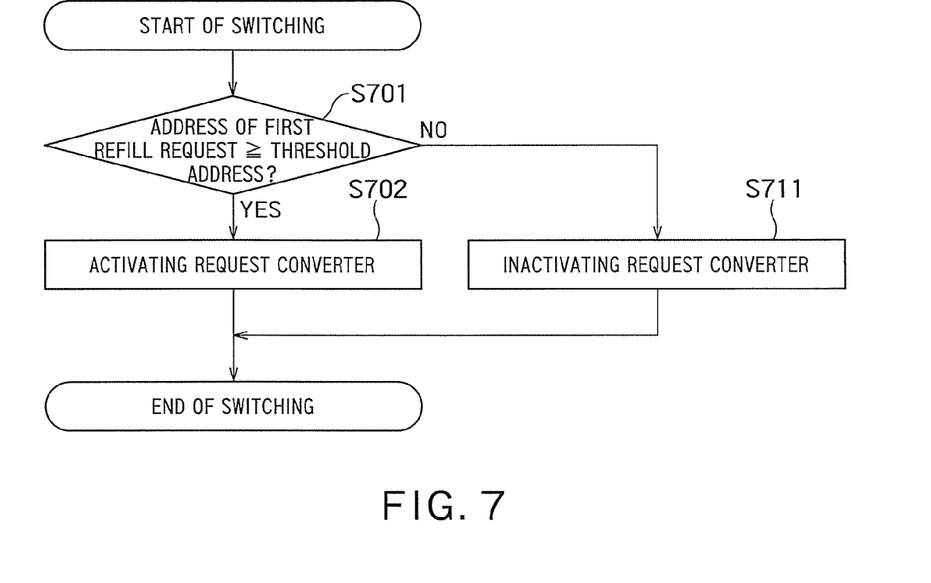
FIG. 7 is a flowchart showing a procedure of switching (first example) by the switch 146.
Figure 8:
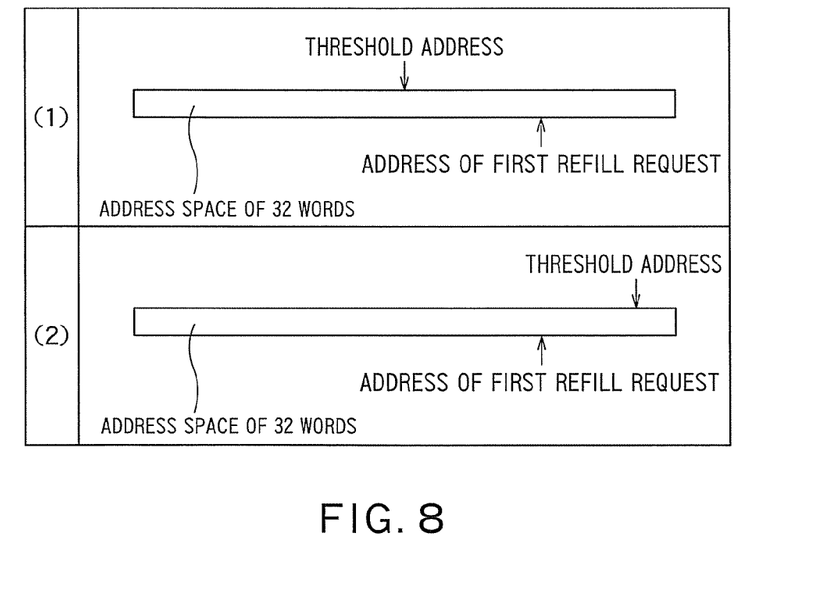
FIG. 8 is a schematic diagram for explaining S701.

A first example of an operation of the switch 146 will be explained. FIG. 7 is a flowchart showing a procedure of switching (first example) by the switch 146. FIG. 8 is a schematic diagram for explaining S701.

Switching of FIG. 7 is performed when it is determined in S302 that the access is the cache access.

<S701> The switch 146 compares an address of the first refill request in an address space of 32 words corresponding to the second line size with a predetermined threshold address. For example, the threshold address is a given value set by a user and stored in a register (not illustrated) in the switch 146. When the address of the first refill request is greater than or equal to the threshold address (FIG. 8 (1)) (S701: YES), S702 is performed. When the address of the first refill request is smaller than the threshold address (FIG. 8 (2)) (in other words, when the address of the data to be processed is in front of the threshold address (S701: NO), S711 is performed.

<S702> The switch 146 activates the request converter 142. Specifically, the switch 146 activates the request converter 142 when the address of the data to be processed is greater than or equal to the predetermined threshold address. Thereby, the request converter 142 can perform converting request (S304). Following completion of S702, switching of FIG. 7 ends.

<S711> The switch 146 inactivates the request converter 142. Thereby, the request converter 142 cannot perform converting request (S304). In this case, transferring second refill request (S305) to transferring refill data (S311) are not performed, and the L2-cache L2 and the L1-cache L1 are normally refilled. Following completion of S711, switching of FIG. 7 ends.

In the first example of the operation of the switch 146, the active and inactive states of the request converter 142 are switched on the basis of whether or not the address of the data to be processed is greater than or equal to the threshold address. Therefore, the power consumption of the cache unit 10 can be reduced and a user can arbitrarily set a condition for switching the active and inactive states of the request converter 142.

Figure 9:
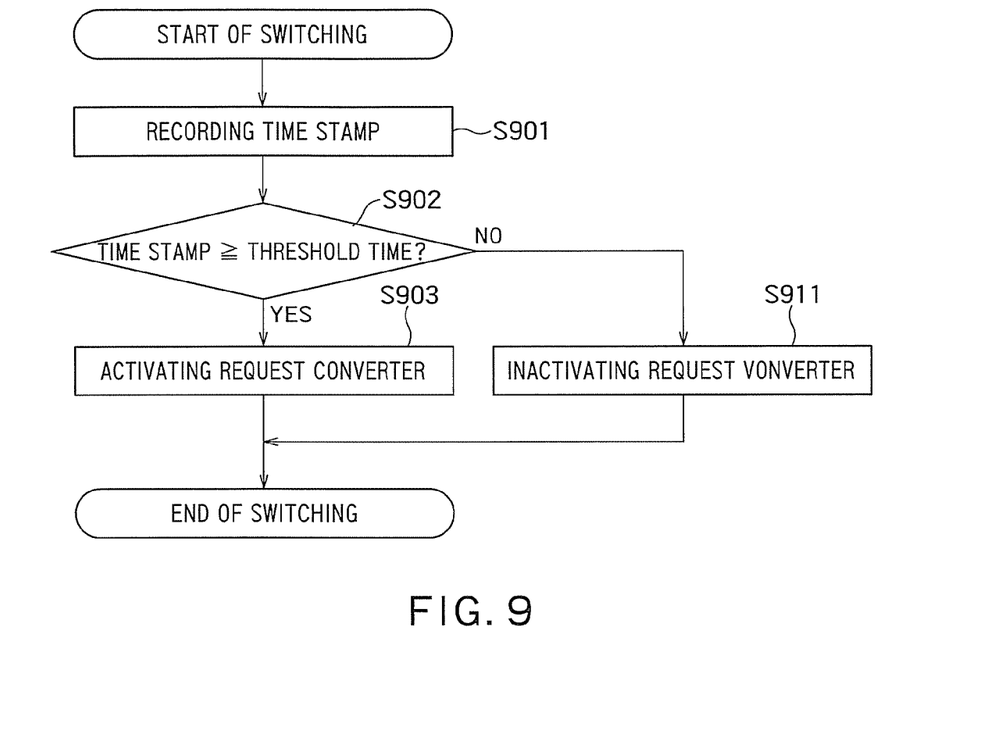
FIG. 9 is a flowchart showing a procedure of switching (second example) by the switch 146.
Figure 10:
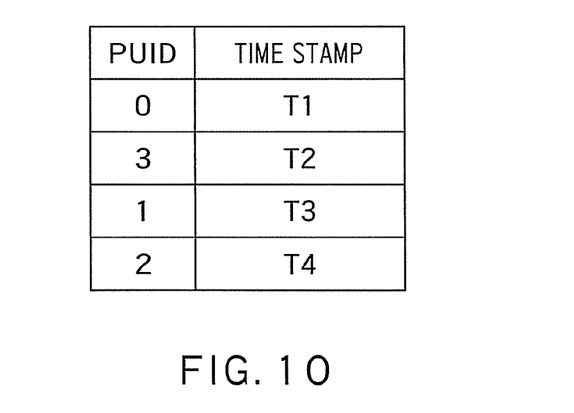
FIG. 10 is a schematic diagram of a request table used in the switching operation in FIG. 9.

A second example of the operation of the switch 146 will be explained. FIG. 9 is a flowchart showing a procedure of switching (second example) by the switch 146. FIG. 10 is a schematic diagram of a request table used in the switching operation in FIG. 9.

Switching of FIG. 9 is performed when it is determined in S302 that the access is the cache access.

<Recording time stamp (S901)> The switch 146 records identification information (hereinafter referred to as "PUID (Processing Unit Identification)") of the processing unit (hereinafter referred to as "source processing unit") that issues the first refill request and a time (hereinafter referred to as "time stamp") when the first refill request has been received by the internal bus interface 12. The PUID is information included in the first refill request. The time stamp is information issued by the internal bus interface 12. The request table is stored in the register in the switch 146. FIG. 10 shows that the time when the first refill request issued by the processing unit PU 0 has been received by the bus interface 12 is T1, the time when the first refill request issued by the processing unit PU 3 has been received by the bus interface 12 is T2, the time when the first refill request issued by the processing unit PU 1 has been received by the bus interface 12 is T3, and the time when the first refill request issued by the processing unit PU 2 has been received by the bus interface 12 is T4.

<S902> The switch 146 compares the time stamp recorded in the request table with a threshold time. For example, the threshold time is a given value set by a user and stored in the register in the switch 146. When the time stamp in the request table is greater than or equal to the threshold time (in other words, when a time greater than or equal to the threshold time has passed since the internal bus interface 12 received the first refill request) (S902: YES), S903 is performed. When the time stamp in the request table is smaller than the threshold time (in other words, when a time greater than or equal to the threshold time has not passed since the internal bus interface 12 received the first refill request) (S902: NO), S911 is performed.

<S903> S903 is the same as S702. Specifically, the switch 146 activates the request converter 142 when the elapsed time since the first refill request has been issued is greater than or equal to a predetermined time. Thereby, the request converter 142 can perform converting request (S304). After S903, switching of FIG. 9 ends.

<S911> S911 is the same as S711. Following completion of S911, switching of FIG. 9 ends.

In the second example of the operation of the switch 146, the active and inactive states of the request converter 142 are switched on the basis of the elapsed time since the first refill request has been issued. Therefore, the power consumption of the cache unit 10 can be reduced and a stall time of the processing unit can be controlled to less than a certain period of time.

Figure 11:
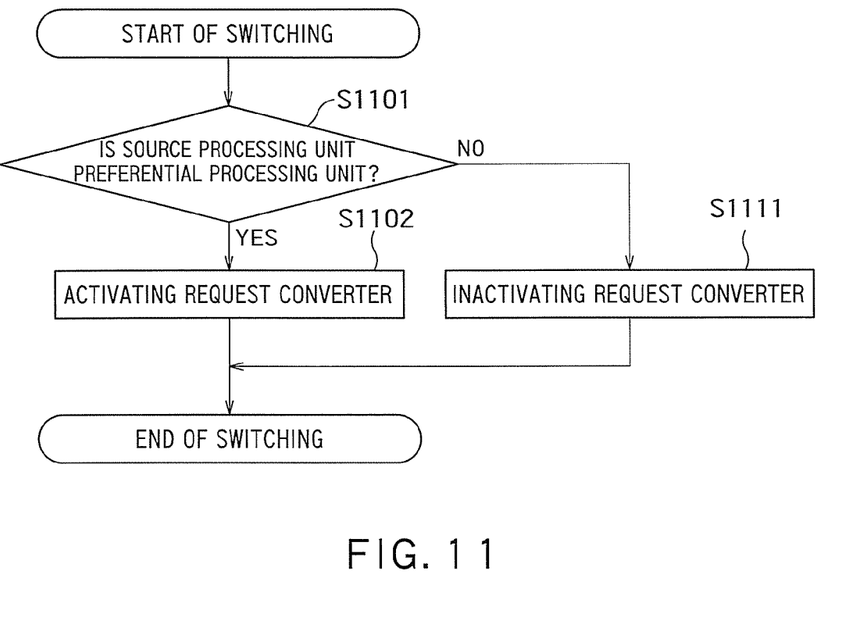
FIG. 11 is a flowchart showing a procedure of switching (third example) by the switch 146.
Figure 12:
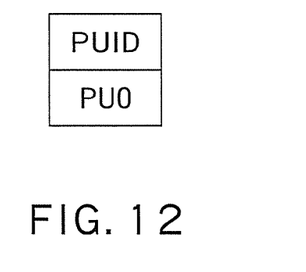
FIG. 12 is a schematic diagram of a preference table used in the switching operation in FIG. 11.

A third example of the operation of the switch 146 will be explained. FIG. 11 is a flowchart showing a procedure of switching (third example) by the switch 146. FIG. 12 is a schematic diagram of a preference table used in the switching operation in FIG. 11.

Switching of FIG. 11 is performed when it is determined in S302 that the access is the cache access.

<S1101> The switch 146 determines whether or not the source processing unit of the first refill request is a preferential processing unit. For example, when the PUID of the source processing unit of the first refill request is included in the preference table, it is determined that the source processing unit of the first refill request is the preferential processing unit. When the PUID of the source processing unit of the first refill request is not included in the preference table, it is determined that the source processing unit of the first refill request is not the preferential processing unit. FIG. 12 shows that the processing unit PU 0 is the preferential processing unit. For example, the preference table is information arbitrarily set by a user and stored in the register in the switch 146. When the source processing unit of the first refill request is determined to be the preferential processing unit (S1101: YES), S1102 is performed. When the source processing unit of the first refill request is determined not to be the preferential processing unit (S1101: NO), S1111 is performed.

<S1102> S1102 is the same as S702. Specifically, the switch 146 activates the request converter 142 when the source processing unit of the first refill request is the preferential processing unit. In the case of FIG. 12, the switch 146 activates the request converter 142 when the source processing unit of the first refill request is the processing unit PU 0. Thereby, the request converter 142 can perform converting request (S304). Following completion of S1102, switching of FIG. 11 ends.

<S1111> S1111 is the same as S711. Following completion of S1111, switching of FIG. 11 ends.

In the third example of the operation of the switch 146, the active and inactive states of the request converter 142 are switched on the basis of whether or not the source processing unit of the first refill request is the preferential processing unit. Therefore, the power consumption of the cache unit 10 can be reduced and a stall time of the processing unit having a higher preference level can be reduced.

Figure 13:
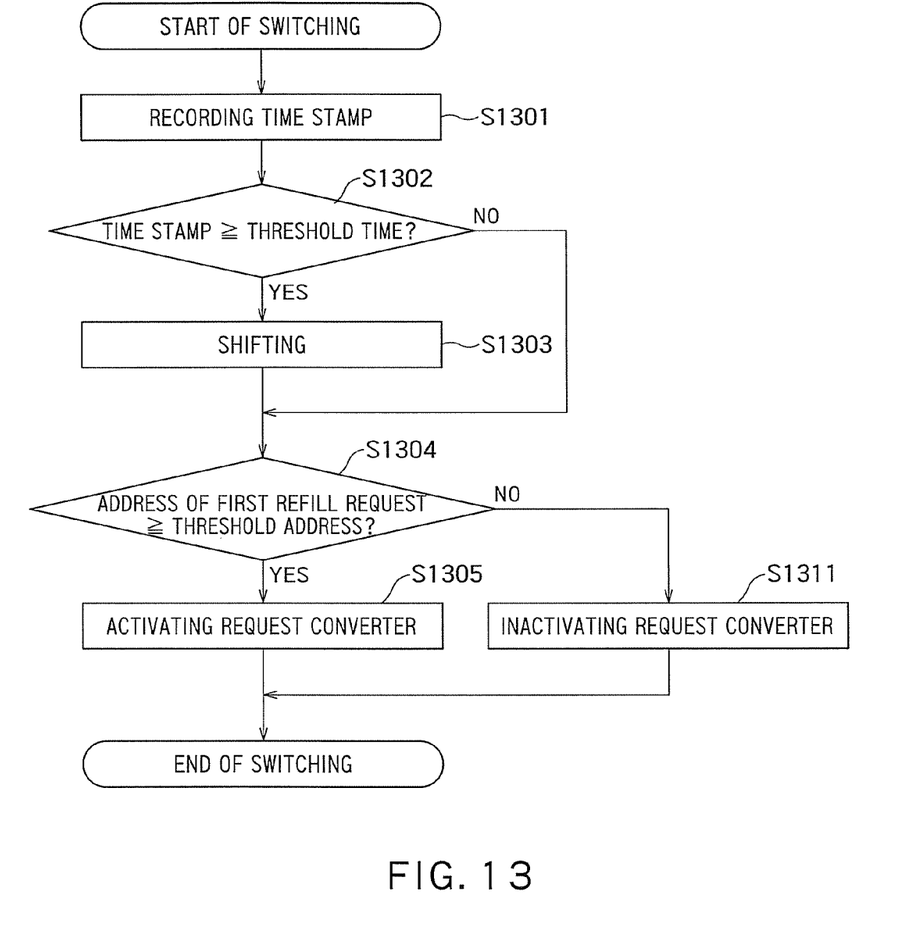
FIG. 13 is a flowchart showing a procedure of switching (fourth example) by the switch 146.
Figure 14:
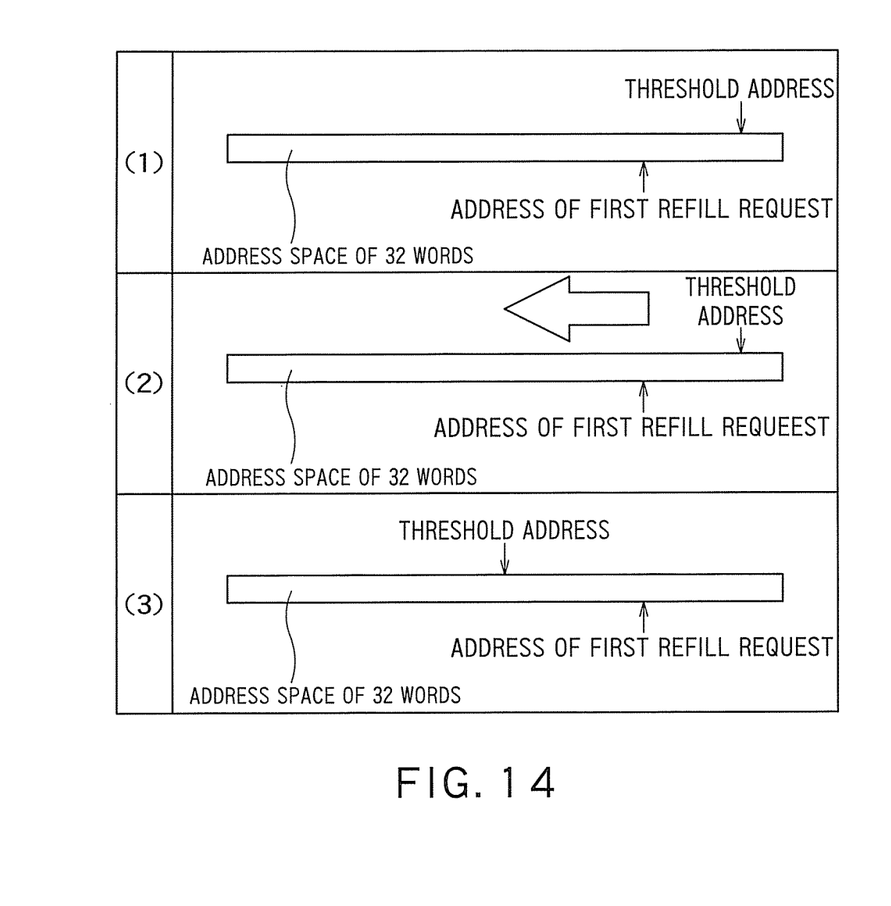
FIG. 14 is a schematic diagram for explaining shifting (S1303) in FIG. 13.

A fourth example of the operation of the switch 146 will be explained. FIG. 13 is a flowchart showing a procedure of switching (fourth example) by the switch 146. FIG. 14 is a schematic diagram for explaining shifting (S1303) in FIG. 13.

Switching of FIG. 13 is performed when it is determined in S302 that the access is the cache access.

<Recording time stamp (S1301)> S1301 is the same as recording time stamp (S901).

<S1302> The switch 146 compares the time stamp recorded in the request table with a threshold time. For example, the threshold time is information arbitrarily set by a user and stored in the register in the switch 146. When the time stamp in the request table is greater than or equal to the threshold time (in other words, when a time greater than or equal to the threshold time has passed since the internal bus interface 12 received the first refill request) (S1302: YES), shifting (S1303) is performed. When the time stamp in the request table is smaller than the threshold time (in other words, when a time greater than or equal to the threshold time has not passed since the internal bus interface 12 received the first refill request) (S1302: NO), S1304 is performed.

<Shifting (S1303)> The switch 146 shifts the threshold address to a smaller address. Specifically, the switch 146 shifts the threshold address greater than the address of the first refill request to a smaller address when the elapsed time since the first refill request has been issued is greater than or equal to a predetermined time (FIGS. 14 (1) and (2)). Thereby, the address of the first refill request becomes greater than or equal to the threshold address (FIG. 14 (3)).

<S1304> S1304 is the same as S701.

<S1305> S1305 is the same as S702. Thereby, even when the address of the first refill request is smaller than the threshold address, the request converter 142 can perform converting request (S304). Following completion of S1305, switching of FIG. 13 ends.

<S1311> S1311 is the same as S711. Following completion of S1311, switching of FIG. 13 ends.

In the fourth example of the operation of the switch 146, when the active and inactive states of the request converter 142 are switched on the basis of whether or not the address of the data to be processed is greater than or equal to the threshold address, if the elapsed time since the first refill request has been issued exceeds a predetermined time, the condition for switching the active and inactive states of the request converter 142 is alleviated. Therefore, the power consumption of the cache unit 10 can be reduced and the request converter 142 can be more easily activated for a processing unit whose stall time exceeds a predetermined time.

Figure 15:
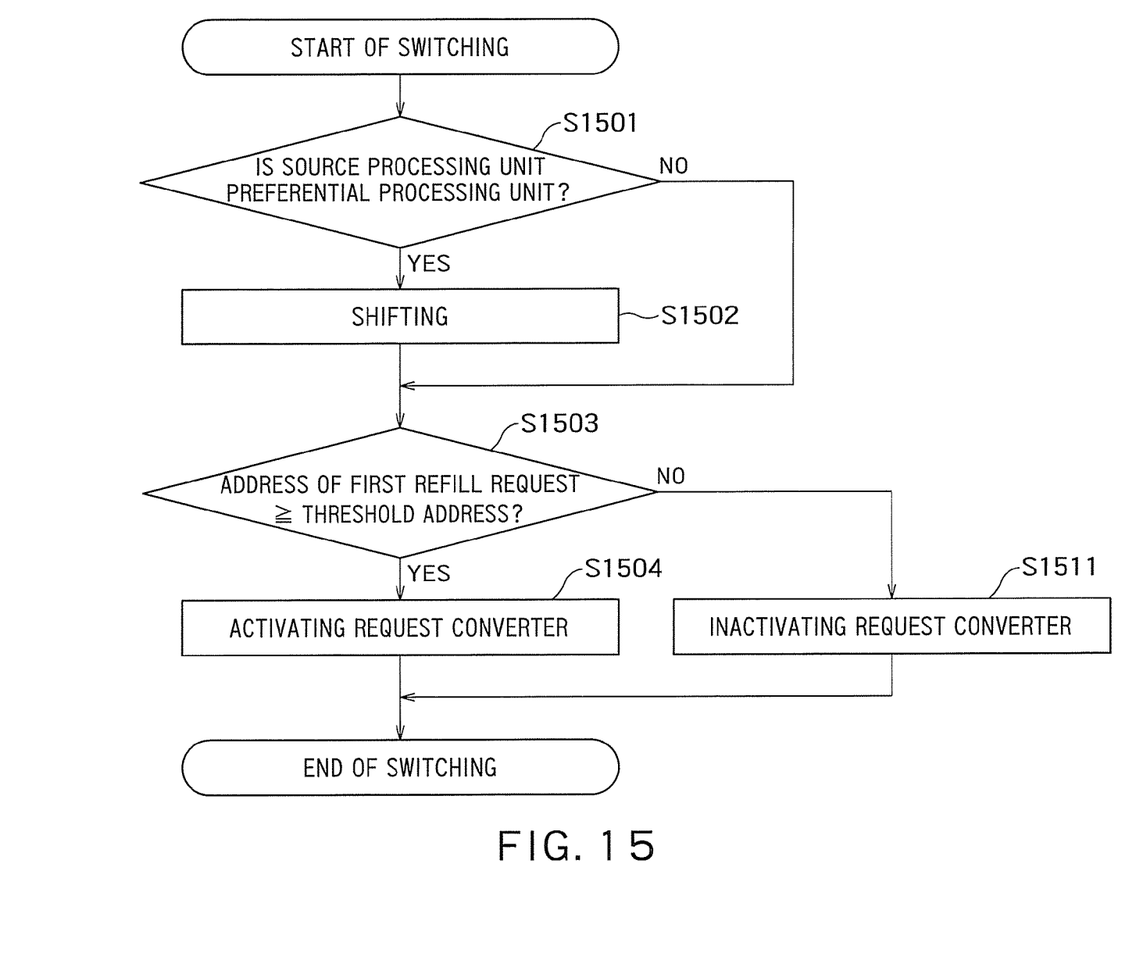
FIG. 15 is a flowchart showing a procedure of switching (fifth example) by the switch 146.

A fifth example of the operation of the switch 146 will be explained. FIG. 15 is a flowchart showing a procedure of switching (fifth example) by the switch 146.

Switching of FIG. 15 is performed when it is determined in S302 that the access is the cache access.

<S1501> S1501 is the same as S1101. When the source processing unit of the first refill request is determined to be the preferential processing unit (S1501: YES), shifting (S1502) is performed. When the source processing unit of the first refill request is determined not to be the preferential processing unit (S1501: NO), S1503 is performed.

<Shifting (S1502)> Shifting (S1502) is the same as shifting (S1303). Specifically, the switch 146 shifts the threshold address (FIG. 14 (1)) greater than the address of the first refill request to a smaller address when the source processing unit of the first refill request is the preferential processing unit (FIG. 14 (2)). Thereby, the address of the first refill request becomes greater than or equal to the threshold address (FIG. 14 (3)).

<S1504> S1504 is the same as S701. Thereby, even when the address of the first refill request is smaller than the threshold address, the request converter 142 can perform converting request (S304). Following completion of S1504, switching of FIG. 15 ends.

<S1511> S1511 is the same as S711. Following completion of S1511, switching of FIG. 15 ends.

In the fifth example of the operation of the switch 146, when the active and inactive states of the request converter 142 are switched on the basis of whether or not the address of the data to be processed is greater than or equal to the threshold address, if the processing unit is the preferential processing unit, the condition for switching the active and inactive states of the request converter 142 is alleviated. Therefore, the power consumption of the cache unit 10 can be reduced and the request converter 142 can be more easily activated for a processing unit having a higher preference level.

The first example to the third example of the operation of the switch 146 may be combined with one another.

In one example, when the first example and the second example of the operation of the switch 146 are combined with each other, even if the address of the first refill request is smaller than the threshold address, the request converter 142 is activated as far as the time Ti recorded in the request table is greater than or equal to the threshold time. Thereby, regardless of the condition for switching the active and inactive states of the request converter 142 set by a user, the stall time of the processing unit can be controlled to less than a certain period of time.

In another example, when the second example and the third example of the operation of the switch 146 are combined with each other, if the source processing unit of the first refill request is the preferential processing unit, the request converter 142 is activated regardless of the time Ti recorded in the request table. If the source processing unit of the first refill request is not the preferential processing unit, the request converter 142 is activated after the time Ti recorded in the request table becomes greater than or equal to threshold time. Thereby, regardless of the elapsed time since the first refill request has been issued, the stall time of the processing unit having a higher preference level can be reduced.

In still another example, when the third example and the first example of the operation of the switch 146 are combined with each other, even if the address of the first refill request is smaller than the threshold address, the request converter 142 is activated as far as the source processing unit of the first refill request is the preferential processing unit. Thereby, regardless of the condition for switching the active and inactive states of the request converter 142 set by a user, the stall time of the processing unit having a higher preference level can be reduced.

The fourth example and the fifth example of the operation of the switch 146 may be combined with each other. For example, when the time stamp is greater than or equal to the threshold time as well as the source processing unit of the first refill request is the preferential processing unit, shifting (S1303) is performed. Thereby, the power consumption of the cache unit 10 can be further reduced and access for the preferential processing unit whose stall time exceeds a certain period of time (in other words, access with a high degree of urgency) can be preferentially speeded up.

Although, in the present embodiments, an example is described in which the data exchanger 144 is provided in the cache controller 14, the data exchanger 144 may be provided in the external bus interface 18 or the un-cache controller 16.

Although, in the present embodiments, an example is explained in which the data exchanger 144 transmits the refill data to the un-cache controller 16 in exchanging data (S310) and the un-cache controller 16 transmits the refill data to the processing unit PU 0 in transferring refill data (S311), the embodiments are not limited to this example. For example, the present embodiments can be applied to a case in which the data exchanger 144 holds the refill data in exchanging data (S310) and transmits the refill data to the processing unit PU 0 in transferring refill data (S311).

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A cache unit transferring data from a main memory connected to the cache unit via an external bus incompatible with a critical word first to a level one cache having a first line size and connected to the cache unit via an internal bus compatible with the critical word first, the unit comprising:
   a cache controller comprising a level two cache and a request converter, the level two cache having a second line size greater than or equal to the first line size, the request converter configured to convert a first refill request of refilling the level one cache into a second refill request in which a head address of a burst transfer is an address of data to be processed and a burst length is less than the first line size when a head address of a burst transfer of the first refill request is not present in the level two cache; and
   an un-cache controller configured to transfer the second refill request converted by the request converter to the main memory, receive the data to be processed corresponding to the second refill request from the main memory, and transfer the received data to the level one cache.

2. The unit of claim 1, further comprising a switch configured to switch an active state and an inactive state of the request converter.

3. The unit of claim 2, wherein the switch activates the request converter when an address of the data to be processed is greater than or equal to a predetermined threshold address.

4. The unit of claim 3, wherein the switch shifts the threshold address to a smaller address when an elapsed time since the first refill request has been issued is greater than or equal to a predetermined time.

5. The unit of claim 3, wherein the switch shifts the threshold address to a smaller address when a source processing unit of the first refill request is a preferential processing unit.

6. The unit of claim 2, wherein the switch activates the request converter when an elapsed time since the first refill request has been issued is greater than or equal to a predetermined time.

7. The unit of claim 2, wherein the switch activates the request converter when a source processing unit of the first refill request is a preferential processing unit.

8. The unit of claim 1, further comprising a data exchanger configured to exchange data, wherein
   the cache controller requests data of the second line size comprising the data to be processed from the main memory,
   the data exchanger exchanges the data of the second line size comprising the data to be processed, requested by the cache controller, into refill data to be located behind the data to be processed when refilling the level one cache, and transfers the exchanged refill data to a processing unit.

9. The unit of claim 1, wherein the un-cache controller allows a refill request of refilling the level two cache to the cache controller.

10. The unit of claim 8, wherein the data exchanger is provided with the cache controller or the un-cache controller.

11. A processing system comprising:
   a main memory;
   a level one cache having a first line size;
   a cache unit configured to transfer data from the main memory to the level one cache;
   an internal bus connecting the level one cache with the cache unit and compatible with a critical word first; and
   an external bus connecting the main memory with the cache unit and incompatible with the critical word first, wherein
   the cache unit comprises:
   a cache controller comprising a level two cache and a request converter, the level two cache having a second line size greater than or equal to the first line size, the request converter configured to convert a first refill request of refilling the level one cache into a second refill request in which a head address of a burst transfer is an address of data to be processed and a burst length is less than the first line size when a head address of a burst transfer of the first refill request is not present in the level two cache; and
   an un-cache controller configured to transfer the second refill request converted by the request converter to the main memory, receive the data to be processed corresponding to the second refill request from the main memory, and transfer the received data to the level one cache.

12. The system of claim 11, further comprising a switch configured to switch an active state and an inactive state of the request converter.

13. The system of claim 12, wherein the switch activates the request converter when an address of the data to be processed is greater than or equal to a predetermined threshold address.

14. The system of claim 13, wherein the switch shifts the threshold address to a smaller address when an elapsed time since the first refill request has been issued is greater than or equal to a predetermined time.

15. The system of claim 13, wherein the switch shifts the threshold address to a smaller address when a source processing unit of the first refill request is a preferential processing unit.

16. The system of claim 12, wherein the switch activates the request converter when an elapsed time since the first refill request has been issued is greater than or equal to a predetermined time.

17. The system of claim 12, wherein the switch activates the request converter when a source processing unit of the first refill request is a preferential processing unit.

18. The system of claim 11, further comprising a data exchanger configured to exchange data, wherein
- the cache controller requests data of the second line size comprising the data to be processed from the main memory,
- the data exchanger exchanges the data of the second line size comprising the data to be processed, requested by the cache controller, into refill data to be located behind the data to be processed when refilling the level one cache, and transfers the exchanged refill data to a processing unit.

19. The system of claim 11, wherein the un-cache controller allows a refill request of refilling the level two cache to the cache controller.

20. The system of claim 18, wherein the data exchanger is provided with the cache controller or the un-cache controller.

* * * * *